(12) United States Patent
Mylly

(10) Patent No.: US 10,372,629 B2
(45) Date of Patent: *Aug. 6, 2019

(54) CONTROL FOR AUTHENTICATED ACCESSES TO A MEMORY DEVICE

(71) Applicant: Memory Technologies LLC, Las Vegas, NV (US)

(72) Inventor: Kimmo J. Mylly, Ylojarvi (FI)

(73) Assignee: Memory Technologies LLC, Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/705,597

(22) Filed: Sep. 15, 2017

(65) Prior Publication Data

US 2018/0067870 A1 Mar. 8, 2018

Related U.S. Application Data

(63) Continuation of application No. 14/839,639, filed on Aug. 28, 2015, now Pat. No. 9,767,045.

(60) Provisional application No. 62/044,065, filed on Aug. 29, 2014.

(51) Int. Cl.
| | |
|---|---|
| *G06F 21/44* | (2013.01) |
| *G06F 12/14* | (2006.01) |
| *G06F 21/57* | (2013.01) |
| *G06F 21/64* | (2013.01) |
| *G06F 21/79* | (2013.01) |
| *G06F 9/4401* | (2018.01) |

(52) U.S. Cl.
CPC .......... *G06F 12/145* (2013.01); *G06F 9/4403* (2013.01); *G06F 21/44* (2013.01); *G06F 21/575* (2013.01); *G06F 21/64* (2013.01); *G06F 21/79* (2013.01); *G06F 2212/1052* (2013.01); *G06F 2212/2022* (2013.01)

(58) Field of Classification Search
USPC ....................................................... 711/163
See application file for complete search history.

(56) References Cited

U.S. PATENT DOCUMENTS

| | | | |
|---|---|---|---|
| 5,535,357 A | 7/1996 | Moran et al. |
| 5,689,459 A | 11/1997 | Chang et al. |
| 5,694,600 A | 12/1997 | Khenson et al. |
| 6,279,114 B1 | 8/2001 | Toombs et al. |
| 6,377,511 B1 | 4/2002 | Okuda et al. |
| 6,842,818 B2 | 1/2005 | Okamoto et al. |
| 7,012,845 B2 | 3/2006 | Kozakai et al. |

(Continued)

OTHER PUBLICATIONS

"Embedded Multimedia Card (eMMC), Electrical Standard 4.51", JEDEC Standard, retrieved on Nov. 10, 2015 at <<http://www.jedec.org/sites/default/files/docs/JESD84-B451.pdf>>, Jun. 1, 2012, 264 pages.

(Continued)

*Primary Examiner* — Mano Padmanabhan
*Assistant Examiner* — Jean C Edouard
(74) *Attorney, Agent, or Firm* — Lee & Hayes, P.C.

(57) ABSTRACT

The embodiments of the invention describe settings, commands, command signals, flags, attributes, parameters or the like for signed access prior to allowing data to be written to (e.g., a write access), read from (e.g., a read access) or erased from (e.g., an erase access) protected areas of a memory device (e.g., a region, logical unit, or a portion of memory in the storage module).

20 Claims, 5 Drawing Sheets

(56) References Cited

U.S. PATENT DOCUMENTS

| | | | |
|---|---|---|---|
| 7,049,652 | B2 | 5/2006 | Mokhlesi et al. |
| 7,058,779 | B1 | 6/2006 | McClain |
| 7,082,525 | B2 | 7/2006 | Hutton et al. |
| 7,136,951 | B2 | 11/2006 | Deng et al. |
| 7,136,994 | B2 | 11/2006 | Zimmer et al. |
| 7,188,265 | B2 | 3/2007 | Kurakata et al. |
| 7,234,049 | B2 | 6/2007 | Choi et al. |
| 7,266,661 | B2 * | 9/2007 | Walmsley ............... G06F 21/73 711/154 |
| 7,555,568 | B2 | 6/2009 | Huang |
| 7,631,245 | B2 | 12/2009 | Lasser |
| 7,739,487 | B2 | 6/2010 | Mylly et al. |
| 7,827,370 | B2 | 11/2010 | Ahvenainen et al. |
| 2002/0156962 | A1 * | 10/2002 | Chopra ............... G06F 9/30032 711/3 |
| 2004/0266480 | A1 | 12/2004 | Hjelt et al. |
| 2005/0005081 | A1 | 1/2005 | Ehama et al. |
| 2005/0210179 | A1 * | 9/2005 | Walmsley ............ B41J 2/04505 711/3 |
| 2006/0294312 | A1 * | 12/2006 | Walmsley ............. H04L 9/0662 711/122 |
| 2007/0050584 | A1 * | 3/2007 | Asauchi ................. G11C 16/22 711/163 |
| 2007/0136609 | A1 | 6/2007 | Rudelic et al. |
| 2007/0192634 | A1 * | 8/2007 | Cheon ..................... G06F 21/10 713/193 |
| 2007/0260836 | A1 * | 11/2007 | Rudelic ............... G06F 12/1441 711/163 |
| 2008/0022396 | A1 * | 1/2008 | Kado .................. G06F 12/1441 726/19 |
| 2009/0070885 | A1 | 3/2009 | Mersh |
| 2009/0282232 | A1 | 11/2009 | Ugokwe |
| 2010/0085807 | A1 * | 4/2010 | Vali ...................... G11C 7/1051 365/185.03 |
| 2010/0106919 | A1 * | 4/2010 | Manning ............ G06F 11/1666 711/154 |
| 2010/0153672 | A1 * | 6/2010 | Jogand-Coulomb ........................ G06F 13/4243 711/164 |
| 2010/0174866 | A1 * | 7/2010 | Fujimoto .............. G06F 9/4401 711/115 |
| 2010/0217919 | A1 * | 8/2010 | Sukegawa ........... G06F 12/0246 711/103 |
| 2011/0314304 | A1 * | 12/2011 | Braams ................... G06F 21/62 713/193 |
| 2012/0011299 | A1 | 1/2012 | Mylly |
| 2012/0042376 | A1 | 2/2012 | Dolgunov et al. |
| 2012/0260023 | A1 | 10/2012 | Nagai et al. |
| 2013/0018979 | A1 * | 1/2013 | Cohen .................. H04L 67/125 709/217 |
| 2013/0159727 | A1 | 6/2013 | Sarangdhar et al. |
| 2013/0198434 | A1 | 8/2013 | Mylly et al. |
| 2013/0212368 | A1 * | 8/2013 | Peng ..................... G06F 9/4406 713/2 |
| 2013/0275661 | A1 | 10/2013 | Zimmer et al. |
| 2013/0282959 | A1 | 10/2013 | Chu |
| 2013/0326219 | A1 * | 12/2013 | Badam ..................... G09C 1/00 713/168 |
| 2016/0062917 | A1 | 3/2016 | Mylly |

OTHER PUBLICATIONS

Office action for U.S. Appl. No. 14/839,639. dated Feb. 10, 2017, Mylly, "Control for Authenticated Accesses to a Memory Device", 22 pages.

PCT Search Report and Written Opinion dated Nov. 19, 2015 for PCT Application No. PCT/US15/47562, 11 pages.

Laplante, Comprehensive Dictionary of Electrical Engineering, 1st Edition, 1999, Definition of Active LowSanDisk Exhibit 1012, Patent Trial and Appeal Board, *SanDisk Corp v. Memory Technologies*, U.S. Pat. No. 7,739,487, Feb. 27, 2017, 3 pgs.

Declaration of Dr.David H. Albonesi in Support of Petition for Inter Partes Review Under 35 USC 311 and 37 CFR 42.100 et seq., Patent Trial and Appeal Board, *SanDisk Corp v. Memory Technologies*, U.S. Pat. No. 7,739,487, SanDisk Exhibit 1002, Feb. 2017, 129 pgs.

File History for U.S. Pat. No. 7,739,487, downloaded Mar. 2018 from USPTO Website, 3 pgs.

M-Systems, DiskOnChip G3 64MG (512Mb), 128MB (1Gb), Flash Disk with MLC and M-System x2 Technology, Data Sheet, Jun. 2004, SanDisk Exhibit 1006, Patent Trial and Appeal Board, *SanDisk Corp v. Memory Technologies*, U.S. Pat. No. 7,739,487, 99 pgs.

Microsoft Computer Dictionary, Fifth Edition, 2002, including pp. 94, 150, 159, 310, 404, 480, 498 and 515, SanDisk Exhibit 1025, Patent Trial and Appeal Board, *SanDisk Corp v. Memory Technologies*, U.S. Pat. No. 7,739,487, Feb. 2017, 17 pgs.

OneNAND Specification, Version 1.2, Samsung Electronics, Flash Memory, Dec. 2005, SanDisk Exhibit 1005, Patent Trial and Appeal Board, *SanDisk Corp v. Memory Technologies*, U.S. Pat. No. 7,739,487, 114 pgs.

"PTO Announces Plan to Put Patent Data on the Internet", Press Release No. 95-31, Nov. 1995, SanDisk Exhibit 1017, Patent Trial and Appeal Board, *SanDisk Corp v. Memory Technologies*, U.S. Pat. No. 7,739,487, 2 pgs.

"PTO Earns Kudos for Website", Mar. 1999 Press Release 99-8, SanDisk Exhibit 1019, Patent Trial and Appeal Board, *SanDisk Corp v. Memory Technologies*, U.S. Pat. No. 7,739,48, 1 pg.

"Secretary Daley to Announce Free Internet Access to 20 Million Pages of U.S. Patent and Trademark Data", Apr. 1999 Press Release 99-11, SanDisk Exhibit 1020, Patent Trial and Appeal Board, *SanDisk Corp v. Memory Technologies*, U.S. Pat. No. 7,739,487, 1 pg.

"The MultiMediaCard", System Specification, Version 1.4, MMCA Technical Committee, SanDisk Exhibit 1009, Patent Trial and Appeal Board, *SanDisk v. Memory Technologies*, U.S. Pat. No. 8,307,180, cited in IDS Nov. 1998, 106 pgs.

"USPTO to Make Comprehensive Patent and Trademark Data Available Free on the Internet", Jun. 1998 Press Release 98-12, SanDisk Exhibit 1018, Patent Trial and Appeal Board, *SanDisk Corp v. Memory Technologies*, U.S. Pat. No. 7,739,487, 2 pgs.

USPTO Full Text and Image Database—Operational Notices and Status—Archives, May 2015, SanDisk Exhibit 1021, Patent Trial and Appeal Board, *SanDisk Corp v. Memory Technologies*, U.S. Pat. No. 7,739,487, 3 pgs.

Curriculum Vitae of Dr. R. Jacob Baker, Kingston Exhibit 1004, *Kingston Technology Co. v. Memory Technologies*, Jan. 31, 2019, 34 pgs.

Declaration of R. Jacob Baker re U.S. Pat. No. 7,739,487 dated Jan. 31, 2019, Kingston Exibit 1003, *Kingston Technology Co. v. Memory Technologies*, 108 pgs.

Information Disclosure Statement (Toombs IDS) and MultiMediaCard System Specification Version 1.4, Kingston Exhibit 1009, *Kingston Technology Co. v. Memory Technologies* Petition for Inter Partes Review dated Jan. 31, 2019, 106 pgs.

Prosecution history for U.S. Pat. No. 7,739,487, Exhibit 1002, *Kingston Technology Co. v. Memory Technologies* Petition for Inter Partes Review dated Jan. 31, 2019, 330 pages.

Third Joint Claim Construction and Prehearing Statement (N.D. Cal. Patent L.R. 4-3) filed in related matter on Nov. 16, 2018, Kingston Exhibit 1024, *Kingston Technology Co. v. Memory Technologies*, 28 pgs.

* cited by examiner

CONTROL FOR AUTHENTICATED ACCESSES TO A MEMORY DEVICE

CROSS REFERENCE TO RELATED APPLICATIONS

This is a continuation application which claims priority to commonly assigned, co-pending U.S. patent application Ser. No. 14/839,639, filed on Aug. 28, 2015, which claims priority to U.S. Provisional Application No. 62/044,065, filed Aug. 29, 2014. Application Ser. Nos. 14/839,639 and 62/044,065 are fully incorporated herein by reference.

BACKGROUND

Managed storage modules, such as managed NAND storage modules, provide many benefits over using raw memories such as flash NAND memories. Managed storage modules, which typically include a storage controller combined with NAND memory in the case of managed NAND or other types of memory in other cases, provide several benefits to device manufactures. The storage controller hides the details of the memory (e.g., NAND) and provides the intended interface and other features, such as error-correcting code (ECC) support without the device manufactures having to implement those features on the host side (e.g., a smartphone or a tablet). Additionally, managed storage modules allow new advanced features to be implemented in the storage controller without the host necessarily having to be aware that the features exist. The advanced features can either be activated or not used by the storage controller depending on whether the host supports the features. Thus, managed storage modules improve backwards compatibility.

Examples of managed storage modules, and in particular managed NAND storage modules, include embedded multimedia cards (eMMC), universal flash storage (UFS), solid-state drive (SSD) modules. These modules are used in wide variety of applications like mobile phones, Global positioning system (GPS) devices, media players, personal computers (PCs), and servers for storing operating system (OS) code, applications, and user data, such as, photos and videos. Along with the data visible to the host device, operational code/firmware (FW) of the storage module itself is stored in the memory of the storage module. Additionally, other important data, which is needed to operate the memory module, such as register data and address translation data, may be stored in the memory.

SUMMARY

An example embodiment of the present disclosure includes a memory device comprising a plurality of addressable memory locations, each addressable memory location of the plurality of addressable memory locations having at least one memory cell, the plurality of addressable memory locations collectively forming a storage. The memory device also comprises one or more controllers operable to: receive a request for a read access to a logical portion of the storage, read data associated with the logical portion of the storage, sign the read data associated with the logical portion of the storage based in part on at least one configurable setting in the memory device indicating that signed access for the logical portion of the storage is enabled, and cause the signed data to be sent in response to receiving the request for the read access

The figures depict embodiments of the present invention for purposes of illustration only. One skilled in the art will readily recognize from the following discussion that alternative embodiments of the structures and methods illustrated herein can be employed without departing from the principles of the invention described herein.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

As discussed above, managed storage modules may store OS code for a host device and/or operational/firmware code for a storage module (e.g. a storage device). Furthermore, managed storage modules may store boot data configured to load the OS code and/or other data in response to powering on a host device. These pieces of code, data, or other information may be particularly sensitive to hacking and/or modification by malware. For example, if malware is able to modify these types of information, then the security of the host device using the storage module may be compromised. Some storage standards, such as those that define eMMC, allow for permanent or temporary (i.e., until power is reset) write protection of definable portions of storage. A description of this procedure may be found in U.S. Pat. No. 7,827,370, filed Jul. 8, 2005, which is hereby incorporated by reference in its entirety.

The embodiments of the invention discussed below describe settings, commands, command signals, flags, attributes, parameters or the like related to a signed access for allowing data to be written to (e.g., a write access), read from (e.g., a read access) or erased from (e.g., an erase access) protected areas of the storage module (e.g., a region, logical unit, or a portion of memory in the storage module).

Figure 1:
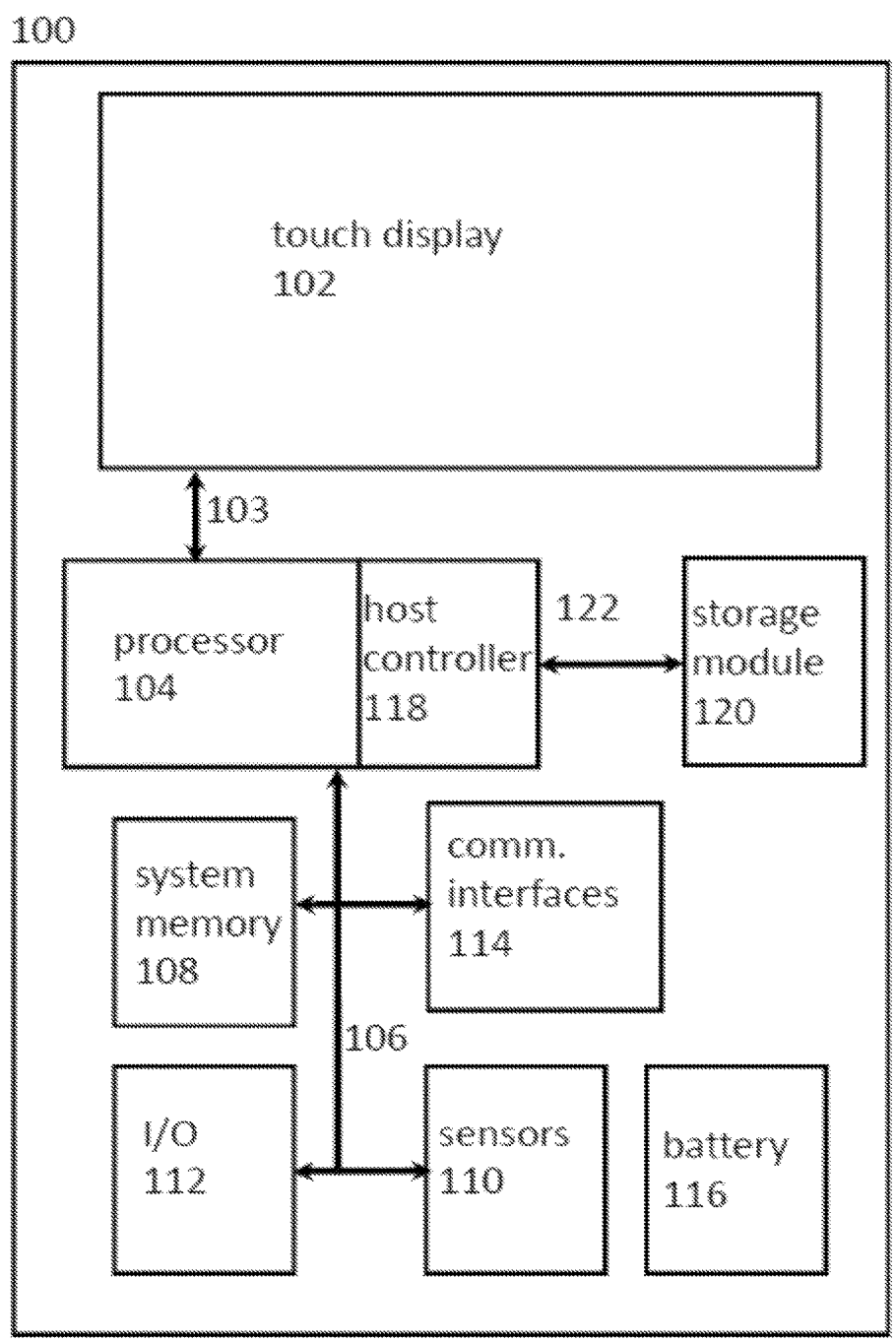
FIG. 1 depicts an example host device.

FIG. 1 depicts an example host device 100, e.g., a smartphone or a tablet, that may utilize embodiments of the present invention. Host device 100 includes a touch display 102 that is sensitive to a user's touch based on capacitive or resistive detection. Bus 103 connects touch display 102 to processor 104, which may include a graphics subsystem that handles the display of graphics and text on touch display 102. Host device 100 also includes a number of other components connected to processor 104 through shared bus 106, including system memory 108 (e.g., DRAM), sensors 110 (e.g., accelerometers, gyroscope, GPS), input/output (I/O) 112 (e.g., a speaker, a microphone, or a keyboard), and communications interfaces 114 (e.g., USB, WiFi, Bluetooth, or other wired or wireless interfaces). In one embodiment, system memory (e.g., DRAM) may be connected to processor 104 via a separate, dedicated bus. Processor 104 may also include a host controller 118 (which may be alternatively connected to but is separate from processor 104) that interfaces with storage module 120 over bus 122. Alternatively, host controller 118 may interface with storage module 120 over shared bus 106. The storage module 120 may sign or authenticate data and/or an access (e.g., a read access, a write access or an erase access). Both shared bus 106 and bus 122 may include several bus lines for data, commands, clocking signals, power, reset, etc. An example of the bus lines included in bus 122 is described below with respect to FIG. 2. Battery 116 provides power to the above described components through a power supply bus and/or lines (not shown). While the use of storage module 120 is shown in the context of a touch sensitive smartphone or tablet, the present invention is not limited to use in such devices. Embodiments of the present invention may be applied to any electronic device that requires storage, e.g., wearable computers such as smartwatches or glasses, televisions, cameras, netbooks, gaming consoles, personal computers, servers, set top boxes, and the like. Additionally, the architecture of 100 is provided for illustrative purposes only and should not be considered limiting.

Figure 2:
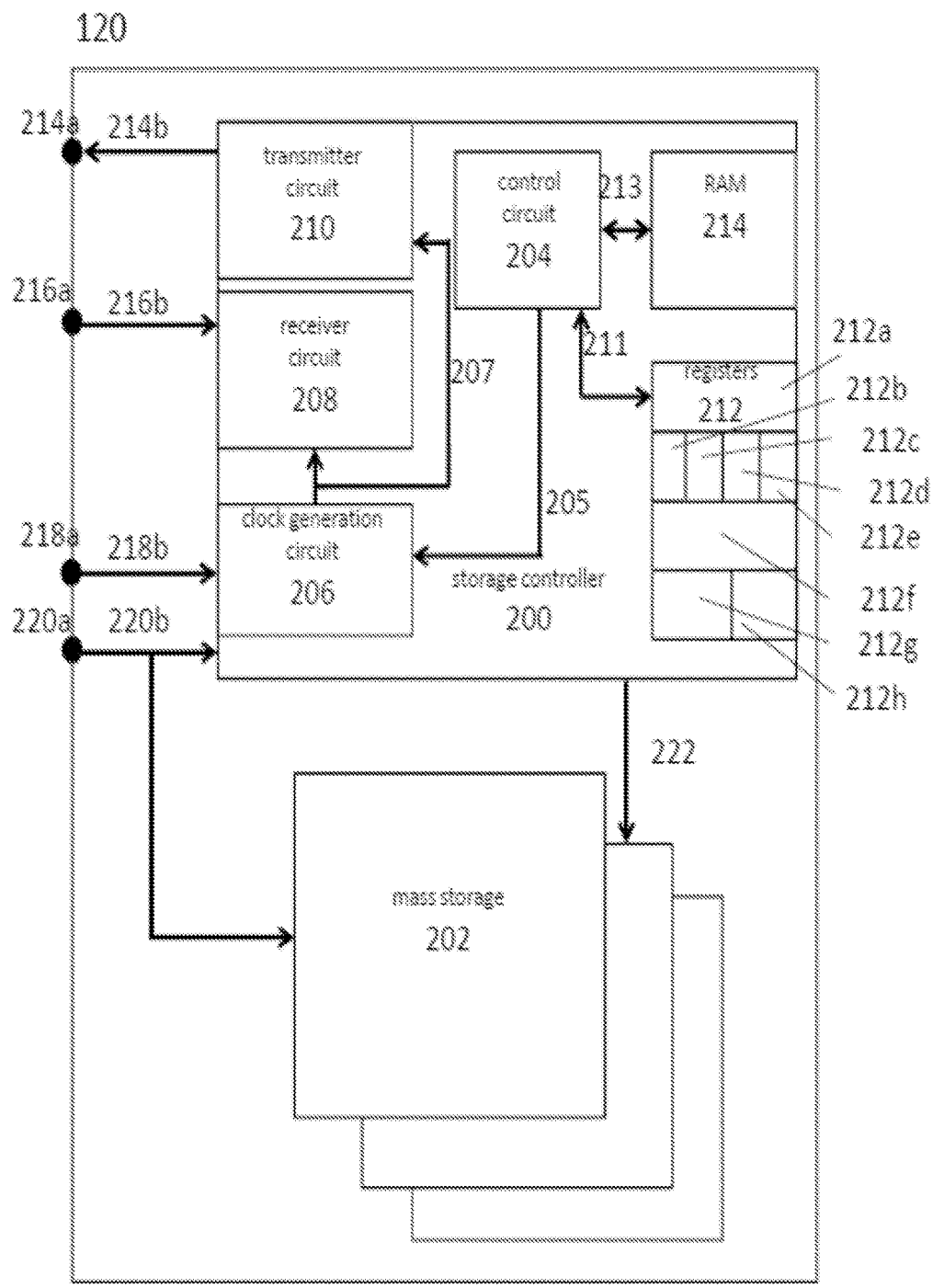
FIG. 2 depicts an embodiment of a storage module.

FIG. 2 depicts an exemplary architecture for storage module 120 that may implement embodiments of the present invention. Storage module 120 may be a memory or storage device contained within a package (e.g., a ball grid array (BGA) package) that is designed to be mounted on a printed circuit board. For example, storage module 120 may be an embedded multimedia card (eMMC) or universal flash storage (UFS) module. Alternatively, storage module 120 may be a memory or storage device contained within a removable card that fits within a slot on the host device or a semi-removable device such as an SSD module or PC/server cards/modules (e.g., PCIe cards). Additionally, although storage module 120 is shown as being one self-contained device, storage module 120 may also be implemented with a collection of interconnected devices.

As shown in FIG. 2, storage module 120 includes storage controller 200 for communicating data between mass storage 202 and host 100 (see FIG. 1). Storage controller 200 includes control circuit 204 for controlling the operation of storage controller 200. Control circuit 204 may be connected to RAM 214 over bus 213 for storing operating information and/or temporary storage as required by storage module 120. Storage controller 200 also includes clock generation circuit 206 for generating an internal clocking signal on internal clock bus 207, receiver circuit 208 for receiving data and commands from host controller 122 (see FIG. 1), transmitter circuit 210 for transmitting data and status information to host controller 122 (see FIG. 1), and registers 212 for storing information and settings relating to the operation of storage module 120, including information related to the generation of the internal clocking. Control circuit 204 may use bus 211 to read information from, or write information to, registers 212. Storage module 120 communicates with host controller 122 through data out line 214b and data terminal 214a, which may provide data and status information, and data in line 216b and data terminal 216a, which may provide data, commands, and status information.

Storage module 120 also includes a clock line 218b and a clock terminal 218a that provide, e.g., a reference clock signal to clock generating circuit 206 or clock for the transmitter/receiver IO block, and power line 220b and power terminal 220a that provide power to storage controller 200 and mass storage 202. While the above lines and terminals are shown to be single lines and terminals in FIG. 2, each line and terminal may be made up of multiple lines and terminals. For example, power terminal 220a may include multiple terminals associated with multiple lines of power line 220b that each individually provide power to the different components (e.g., mass storage 202 and storage controller 200). As another example, data out line 214b and data out terminal 214a or data in line 216b and data in terminal 216a may be implemented using two lines (e.g., a differential pair or a 2-bit wide bus) connected to two terminals. Bus 222 allows for storage controller 200 to read data from, and write data to, mass storage 202.

Storage module 120 also includes mass storage 202, which includes one or more memory blocks on one or more memory planes/banks on one or more chips having memory circuits or cells for storing one or more bits of information. For example, mass storage 202 may be implemented with a non-volatile memory such as NAND flash memory having memory cells/circuits (e.g., NAND cells) each capable of storing one bit (single-level cell) or multiple bits (multi-level cell) of data. Other forms of non-volatile memory can also be used without departing from the present invention. For example, non-volatile memory may include phase change memory (PCM), magneto-resistive random-access memory (MRAM), resistive random-access memory (RRAM), ferroelectric random-access memory (FRAM), and so forth.

In various implementations, mass storage 202 includes a plurality of addressable memory locations that are each associated with at least one memory cell, a byte, a word or multiple words, at least one memory plane/blank, at least one memory block, or at least one memory page. One or more addressable memory locations may also comprise, or in some way be associated with, a region or portion of memory, as discussed herein. An address may be a logical address or a physical address.

Mass storage 202 may be physically and/or logically divided. For example, mass storage 202 may be implemented as a single chip. Alternatively, mass storage 202 may be implemented with several discrete chips that are connected together in a single package (as shown in FIG. 2) or, alternatively, separately packaged and externally connected together. Mass storage 202 may also be divided up into planes/banks which are then further divided into blocks, which are then further divided into pages. Storage controller 200 is connected to mass storage 202 through bus 222, which allows for storage controller 200 to read data from, and write data to, mass storage 202.

RAM 214 is a memory that storage controller 200 uses to store operating information (e.g., operating code and/or state information) that may need to be readily/quickly accessed. For example, RAM 214 may store a translation table that describes how logical addresses are mapped to physical addresses of mass storage 202. When RAM 214 is not implemented or not enough RAM 214 is implemented within storage module 120, in some cases, storage controller 200 may instead request and use a portion of system memory 108 of host 100 (see FIG. 1), as described in U.S. patent application Ser. No. 12/455,763, filed Jun. 4, 2009, which is incorporated by reference in its entirety.

Clock generation circuit 206 may be implemented with a circuit that is capable of generating a clock signal. For example, clock generation circuit 206 may be implemented using common clock recovery and/or generation circuits including PLLs, oscillators, voltage controlled oscillators, delay locked loops, frequency detectors, frequency multipliers/dividers, phase detectors, combinations of these circuits, or any other suitable circuit. Clock generation circuit 206 may also rely on other components, such as resistors, capacitors, inductors, crystals, or MEMS devices. Clock generation circuit 206 may also be programmable so that it can provide a clocking signal output that varies according to the inputs that it receives. For example, clock generation circuit 206 may be configured to produce a clocking signal of a very high quality (e.g., low jitter) when a reference clock signal is present on reference clock line 218b. Clock generation circuit 206 may also be configured to produce a clocking signal of a lower quality when a reference clock signal is absent.

As other examples, the frequency, duty cycle, jitter, output skew, or propagation delay of the outputted clocking signal may be set according to inputs (e.g., control bits) that are provided to clock generation circuit 206 through bus 205. In alternative architectures, clock generation circuit 206 have direct access to registers 212 without going through control circuit 204 or clock generation circuit 206 could have a register internal to itself for storing clock configuration information. While clock generation circuit 206 is shown to be part of storage controller 200, clock generation circuit 206 may also be implemented external to storage controller 200 without departing from the present invention.

Receiver circuit 208 and transmitter circuit 210, e.g., receive the internal clock signal directly on clock line 218b or on internal clock line 207 so that storage module 120 may transfer data to host 100 at higher rates than without a clock signal. In another embodiment, internal clock line 207 only provides the internal clock signal to the receiver circuit 208, but not to the transmitter circuit 210. In yet another embodiment, internal clock line 207 only provides the internal clock signal to the transmitter circuit 208, but not to the receiver circuit 210.

Registers 212 store one or more bits of information regarding the operation of storage module 120. Registers 212 may be implemented as part of storage controller 200, as part of mass storage 202, as part of RAM 214, or as part of some other memory circuit in storage module 120. The memory used for registers 212 may be any type. For example, registers 212 may be implemented in volatile (e.g., SRAM, DRAM), non-volatile (flash, magnetic, resistive), ROM, one time programmable, or any combination of different types of memory.

Registers 212 may include several individual registers, e.g., registers 212a-212h of similar or different sizes. For example, register 212a may be a 1-byte register while registers 212b-212e are 1-bit registers and register 212f is a 4-byte register. Registers 212 can be used to store several specific types of information. In one case, some of registers 212 store read-only information that describes how storage module 120 operates (e.g., supported features) or requirements for storage module 120 to properly operate or operate at different levels of performance (e.g., current requirements for different transfer rates). In another case, some of registers 212 store writeable information that configures how storage module 120 operates or what storage module 120 needs to operate. In yet another case, some of registers 212 store information about how storage module 120 is currently operating or the current state of storage module 120. Together, registers 212 may also store all of the different types of information described above along with other types of data. Registers 212 may also be used to implement descriptors, flags, and attributes as described in JEDEC Standard No. 220A for Universal Flash Storage (UFS 1.1), published June 2012, which is incorporated by reference herein in its entirety.

In one case, registers 212 store settings indicating, defining, or configuring whether or not signed access to data is enabled or required (e.g., for a read access, a write access, or an erase access). The signed access may be associated with a particular region or portion of mass storage 202 or may be associated with the mass storage as a whole (e.g. to apply to all data accesses to any region or portion of the mass storage if enabled). A setting may be associated with (e.g., may identify) the region or the portion of the mass storage 202 that stores the data to be signed and the setting may be configured to enable or disable signed access to the region or the portion of mass storage 202. Moreover, the setting may be configured to require signed access to the region or the portion of the mass storage 202. A register may define a region of memory, either logical or physical, and whether signed access for the region is required, enabled or disabled. For example, register 212f, with a defined setting, may specify an address range, a block range, a partition, a logical unit or the like that defines the region or the portion of memory (e.g., mass storage 202). Another register, e.g. register 212g, may define whether the region permanently requires or temporarily requires signed access. Yet another register or a setting may define whether or not a request to change settings stored in the registers requires signing of the request by the host device and/or authentication of the request by the storage device 120. Accordingly, the settings in registers are able to variably specify whether or not different portions of memory are access protected and/or whether or not different settings are protected. Implementation of these features are discussed below with respect to various embodiments of the invention.

Control circuit 204 may include a state machine or several state machines. Alternatively, as another example, control circuit 204 may include one or more general purpose processors or microcontrollers that are programmed to control storage module 120. For example, a processor programmed with firmware may implement one or more state machines that govern the operation of storage module 120. Firmware or other software for programming control circuit 204 may be stored in dedicated storage or in a reserved storage area on mass storage 202. As another alternative, control circuit 204 may be implemented as a combination of a general purpose processor programmed with firmware or the like and special purpose circuitry that perform specific functions.

Other functions of control circuit 204 include receiving command signals from host 100 to perform certain functions. For example, control circuit 204 may receive command signals from host 100 to read information from, or write information to, registers 212. For instance, control circuit 204 may receive a command to read registers 212 in a location that stores a state of storage module 120 (e.g., a power state, a programming state, etc.).

In one embodiment, a command signal may comprise, or in some way be associated with, a request from the host 100 to read data from, or write data to, or erase data from mass storage 202. For example, the host 100 may send a boot request (e.g., a boot command or signal), e.g., upon powering on, to the storage controller 200 requesting that the storage controller 200 send boot data stored in a boot partition. In response, the storage controller 200 may access a register 212 to determine that a setting defining that signed access to the boot partition is enabled or required, and therefore, the storage controller 200 must sign the boot data before sending the boot data to the host 100. The storage controller 200 may use a signature mechanism (e.g., a secret key, a nonce, a random number, message authentication code, etc.) to sign the boot data and then the storage controller 200 may send the signed boot data to the host 100. The host can then authenticate or verify the signed boot data. Accordingly, upon authentication, the host can trust that the storage controller 200 has provided authentic boot data that has not been compromised by a hacker or by malware.

It should be understood that the architecture of FIG. 2 is an example for ease of discussion only and should not be considered limiting on the invention. Circuits, buses, lines, modules and the like may have been simplified, left out, or otherwise combined with other components in FIG. 2. For example, storage module 120 is shown to have buses 207, 205, 213, 211, and 222, these buses may be removed, combined, rerouted, and/or added to without departing from the spirit of the invention described herein. As another example, the functionality of control circuit 204 may be greatly expanded over what is described above or the functions described above by control circuit 204 may be spread across different circuits.

Figure 3:
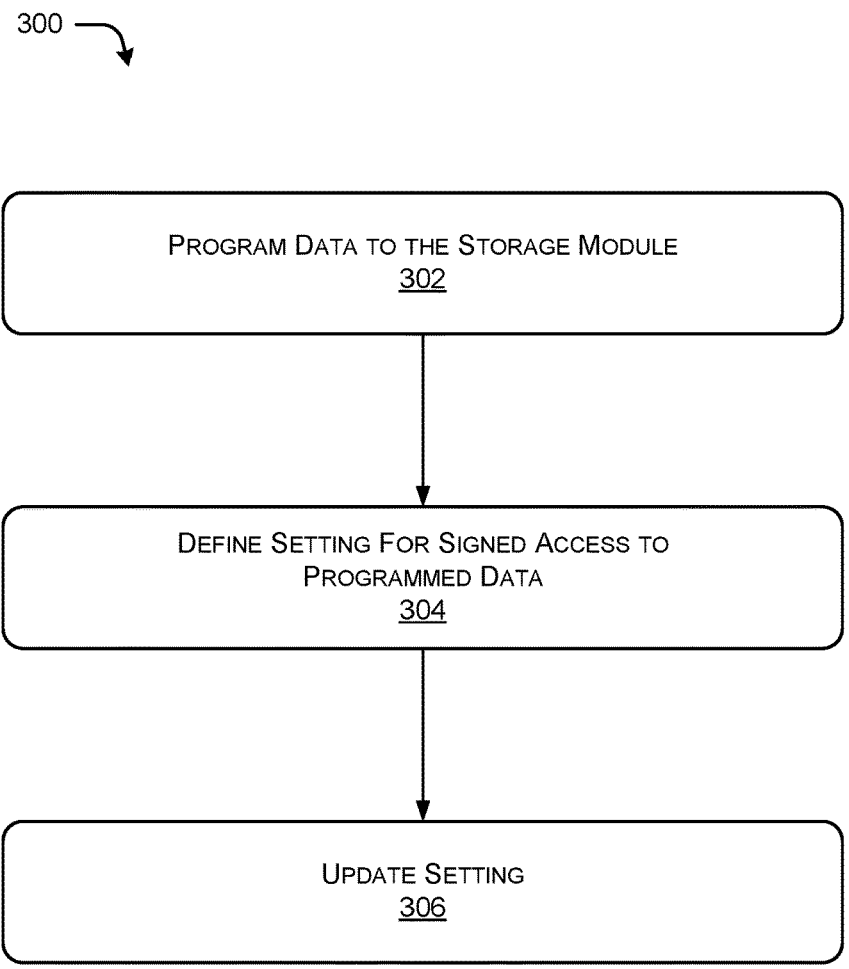
FIG. 3 depicts a process flow of a first embodiment of the invention.

FIG. 3 depicts an exemplary process 300 for implementing a first embodiment of the invention. At least part of the process 300 may be implemented during a manufacturing stage of the host 100. In step 302, data is programmed to the storage module 120 (e.g., stored in the mass storage 202). For example, the data may be boot data or other operational data (e.g., OS code).

In step 304, a setting may be defined to enable or require, or to disable or not require, signed access to the programmed data. A defined setting may be stored in one or more of registers 212, as discussed above with respect to FIG. 2. The setting may be a definable value. The setting may identify a region or a portion of memory (e.g., of mass storage 202) where the data is stored. The setting may be specific to a particular region or portion of memory, or a register or set of registers may define settings for one or more or all regions or portions of memory. In at least one implementation, the storage module 120 may also be provided with a signature mechanism (e.g., a secret key, a nonce, a random number, a message authentication code) that can be used to sign data in response to receiving a request to read the data. For example, the data may be signed by: 1) encoding the boot data with the signature mechanism, 2) appending the signature mechanism to the boot data, 3) sending the signature mechanism separate from the boot data, or 4) any combination of at least two of the previous three examples. The signing of the data or the signing of the access with a signature mechanism should only be performed by those that are trusted to access, manage and/or modify the region or the portion of memory (e.g., the manufacturer of the host, the manufacturer of the storage module, etc.). For example, the signing of the data may be based on the data and the key and potentially other factors/elements, e.g., like a nonce. One such method of signing data may be found in JEDEC Standard No. JESD84-B451, published June 2012, which is incorporated by reference in its entirety. Specifically, section 6.6.22 describes one method for signing data. The signed data may also be encrypted in order to allow for an additional layer of security.

In various implementations, a setting associated with a particular region or portion of memory may be defined to be applied to different types of accesses (e.g., each of a read access, a write access and an erase access). Alternatively, a particular region or portion of memory may have multiple defined settings, e.g., a first setting enabling or disabling signed access for a first type of access (e.g., a read access) and a second setting enabling or disabling signed access for a second type of access (e.g., a write access).

In various implementations, a setting may be associated with, or dedicated to, an individual or specific region or portion of memory (e.g., a boot partition). Alternatively, a setting may be associated with multiple regions or portions of memory (e.g., a boot partition and a user partition).

In step 306, the setting may be updated. For example, the setting may be re-defined at a later time such that a previously enabled setting requiring signed access may be disabled, or vice versa. In at least one implementation, the storage module 120 may receive a command (e.g., from the host 100) to update and change the setting, e.g., to disable the signed access of the logical portion of the mass storage 202. In various implementations, a change of the setting itself may also require authentication.

Figure 4:
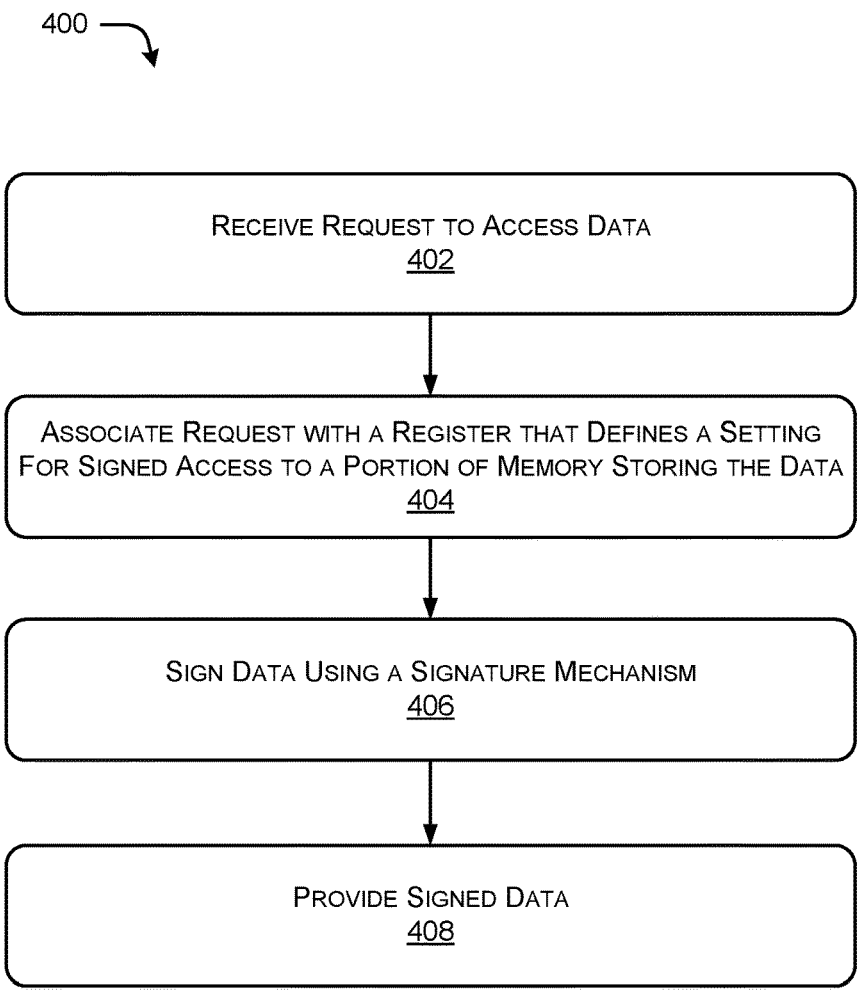
FIG. 4 depicts a process flow of a second embodiment of the invention.

FIG. 4 depicts an exemplary process 400 for implementing a second embodiment of the invention. At least part of the process 400 may be implemented during a post manufacturing stage (e.g., after one or more steps of process 300). For example, at least part of the process 400 may be implemented in association with a host device boot sequence.

In step 402, the storage module 120 receives a request to access data. As discussed above, the request may be associated with a read command or write command received from the host 100. For example, the request may be associated with a boot command in which the host 100 requests that boot data be provided from the storage module 120 to the host 100. The request may identify a particular region or portion of memory (e.g., in the mass storage 202).

In at least one implementation, the request may include, or in some way be associated with, a nonce which may be used as a parameter to sign the data to be accessed in association with the request (e.g., the nonce can be used as at least part of the signature mechanism along with a secret key). For example, the storage module 120 may use a nonce provided by the host 100 to sign the data (e.g., boot data) read from the region or portion of the mass storage. In this implementation, the host 100 may already be aware that accessing the data requires signing the data (e.g., based on a defined setting). Such a parameter could be provided by the host either as a command signal (e.g. state of a command or data signal line), a command argument (e.g. a bit set in a command frame), a bit or set of bits in a data line, or a combination of some or all of these. The host 100 may also provide other parameters in the request, or in some way associated with the request. For example, these other parameters may include a counter or an address.

In at least one implementation, the request may include a command line state that the storage module 120 is configured to interpret as an indication for signed access. The command line state may indicate a low signal effective for signed booting of the host 100 based on the boot data (e.g., holding the command line low for at least 74 clock cycles during power-up, e.g., along with holding a data line low). In this implementation, the host 100 may already be aware that accessing the boot data requires signing the data (e.g., based on a defined setting).

In at least one implementation, the request may include one or more arguments that the storage module 120 is configured to interpret as an indication for signed access. Signed access may be permitted with or without a register storing a setting that indicates signed access for a region or a portion of memory. For example, the request may include a command with a specific argument (e.g., CMD0 with argument 0xFFFFFFFA), as described in U.S. Pat. No. 7,739,487, filed Jan. 17, 2006, which is incorporated by reference in its entirety. In an additional example, the request may include a CMD line held low or a CMD0 with a boot argument that may be used to indicate a signed boot data access (e.g., read access) due to a setting in the storage device. In yet a further example, the request may include a CMD line held low with a data line held low or CMD0 with a dedicated argument that may be included to indicate that a signed boot data access (e.g., read access) is requested despite, or independent of, a setting in the storage device (e.g., even if a signed read access is not required).

Table 1 provides Examples (e.g., (A), (B), (C) and (D)) in which a determination regarding whether to deliver signed or unsigned data may be implemented.

TABLE 1

| | Setting | Host Request | Result[#] |
|---|---|---|---|
| (A) | Disabled | Normal boot (e.g. CMD line low) | Delivery of unsigned boot data |
| (B) | Disabled | Signed boot (e.g. CMD0 + specific argument) | a) Host request overrules the storage device setting and signed data is delivered<br>b) Storage device setting overrules and unsigned data is delivered<br>c) Due to conflict between setting and request no data is delivered (instead potentially an error status is indicated) |
| (C) | Enabled | Normal boot (e.g. CMD0 + specific argument) | a) Host request overrules the storage device setting and unsigned data is delivered<br>b) Storage device setting overrules and signed data is delivered<br>c) Due to conflict between setting and request no data is delivered (instead potentially an error status is indicated) |
| (D) | Enabled | Signed boot (e.g. CMD low + Data0 low) | Delivery of signed data |

As shown in Example (A) of Table 1, if the setting, e.g., in a register of the storage module 120, indicates that signed access is disabled and a "normal" boot request is received from the host device, then the storage module may deliver unsigned data (e.g., boot data).

As shown in Example (B) of Table 1, if the setting indicates that signed access is disabled and a "signed" boot request (e.g., a request provided with a parameter indicating signed access) is received from the host device, then the storage module may make a determination on whether or not to deliver signed data. In Implementation (a) of Example (B), the signed boot request received from the host device may over-rule, or have priority over, a setting in the storage module (e.g., the disabled setting), and thus, the storage module may deliver signed data. In Implementation (b) of Example (B), a setting in the storage module (e.g., the disabled setting) may over-rule, or have priority over, the signed boot request received from the host device, and thus, the storage module may deliver unsigned data. In Implementation (c) of Example (B), if there is a conflict between a setting in the storage module (e.g., the disabled setting) and the signed boot request received from the host device, then the storage module may not deliver any data and may instead indicate an error status.

As shown in Example (C) of Table 1, if the setting indicates that signed access is enabled and a "normal" boot request is received from the host device, then the storage module may make a determination on whether or not to deliver signed data. In Implementation (a) of Example (C), the normal boot request received from the host device may over-rule, or have priority over, a setting in the storage module (e.g., the enabled setting), and thus, the storage module may deliver unsigned data. In Implementation (b) of Example (C), a setting in the storage module (e.g., the enabled setting) may over-rule, or have priority over, the normal boot request received from the host device, and thus, the storage module may deliver signed data. In Implementation (c) of Example (C), if there is a conflict between a setting in the storage module (e.g., the enabled setting) and the normal boot request received from the host device, then the storage module may not deliver any data and may instead indicate an error status.

As shown in Example (D) of Table 1, if the setting indicates that signed access is enabled and a "signed" boot request is received from the host device, then the storage module may deliver signed data.

Additionally or alternatively, there may be configurable settings in the storage device to control which one of Implementations (a), (b) and/or (c) to apply in different conflicting cases of Examples (B) or (C), as discussed above. For instance, an additional setting could be configured in production of the host device indicating that the request by the host device overrules a setting (e.g., enabled or disabled) in the storage device.

In some implementations, the request may include a specific argument and/or a nonce. In some implementations, the host 100 may use the command line state, a nonce and/or an argument to indicate that it wants to receive signed data, and thus, a signed read access is required independent of any defined setting (e.g., even if a defined setting indicates signed access is disabled or if there is no defined setting for the region of memory).

In step 404, the storage module 120 associates the request with a register that stores a setting defining that signed access for a region or a portion of memory storing the data is enabled or required. For example, the request may identify the region or the portion of memory (e.g., a boot partition) and the storage module 120 may use the identification to access a register storing a setting associated with the region or the portion of the memory.

In step 406, the storage module 120 signs the data using a signature mechanism. In at least one implementation, the signature mechanism may be a secret key stored or maintained in the storage module 120 (e.g., a separate register that maintains a secret key, a register that defines the setting enabling or disabling signed access, etc.). In at least one implementation, the signature mechanism, or at least part of the signature mechanism, used to sign the data may be based on a parameter provided by the host (e.g., a nonce may be used in addition to usage of the secret key). By having the host provide the parameter, an additional layer of security may be added to ensure that the data being provided to the host has not been compromised.

In step 408, the storage module 120 provides the signed data, e.g., to the host that made the request.

Figure 5:
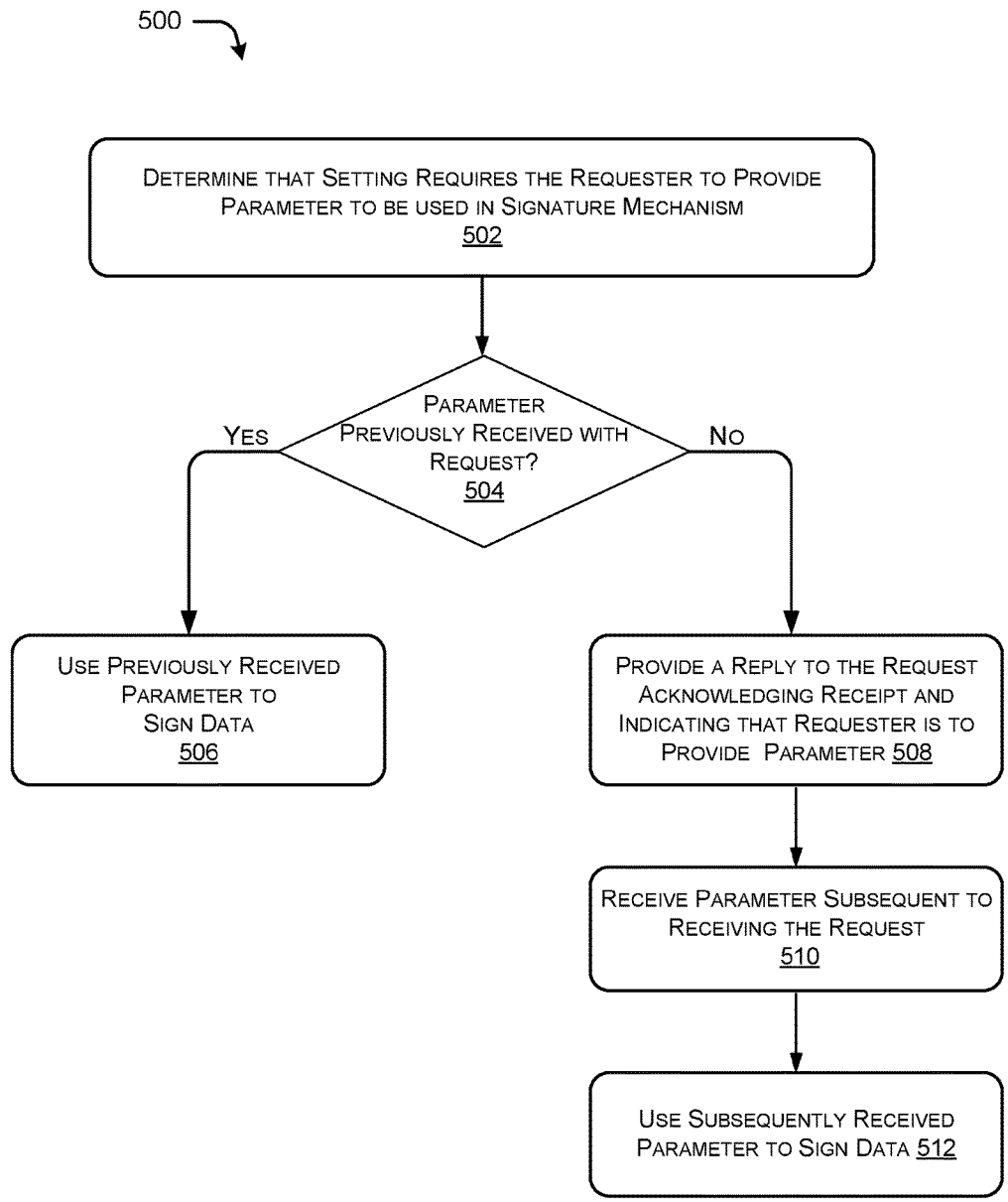
FIG. 5 depicts a process flow of a third embodiment of the invention.

FIG. 5 depicts an exemplary process 500 for implementing a third embodiment of the invention. At least part of the process 500 may be implemented in association with process 400. For example, at least part of the process 500 is associated with a handshake that may be implemented before providing the signed data, e.g., to the host that made the request.

In step 502, after receiving a request, the storage module 120 determines that a setting requires the requester (e.g., the host 100) to provide a parameter to be used as at least part of the signature mechanism.

In decision step 504, the storage module 120 determines whether or not the parameter was previously received with the initial request. If the answer is "yes" at decision step 504 (e.g., the host provided a nonce as part of the request), the process proceeds to step 506 where the storage module 120 uses the previously, or already, received parameter to sign the data.

If the answer is "no" at decision step 506, the process proceeds to step 508 where the storage module 120 provides a reply to the request, the reply acknowledging receipt of the initial request and the reply indicating that the requester is required to provide a parameter to be used to sign the data.

In step 510, the storage module 120 receives the parameter subsequent to receiving the initial request.

In step 512, the storage module 120 uses the subsequently received parameter to sign the data. Accordingly, the host 100 can send, and the storage module 120 can receive, an initial request and a parameter separately.

Although a feature may appear to be described in connection with a particular embodiment, one skilled in the art would recognize that various features of the described embodiments may be combined. Moreover, aspects described in connection with an embodiment may stand alone.

The following paragraphs describe example embodiments of the present disclosure.

Example Embodiment A, a memory device comprising: a plurality of addressable memory locations, each addressable memory location of the plurality of addressable memory locations having at least one memory cell, the plurality of addressable memory locations collectively forming a storage; one or more controllers operable to: receive a request for a read access to a logical portion of the storage; read data associated with the logical portion of the storage; sign the read data associated with the logical portion of the storage based in part on at least one configurable setting in the memory device indicating that signed access for the logical portion of the storage is enabled; and cause the signed data to be sent in response to receiving the request for the read access.

Example Embodiment B, the memory device according to Example Embodiment A, wherein the one or more controllers are further operable to use a key to sign the read data associated with the logical portion of the storage.

Example Embodiment C, the memory device according to Example Embodiment A, wherein: the one or more controllers are further operable to use a nonce to sign the read data associated with the logical portion of the storage; and the nonce is received in association with the request for the read access.

Example Embodiment D, the memory device according to any one of Example Embodiment A through Example Embodiment C, wherein the one or more controllers are further operable to check, based at least in part on the request for the read access, the at least one configurable setting in the memory device to determine that signed access is specifically enabled for the logical portion of the storage prior to signing the read data associated with the logical portion of the storage.

Example Embodiment E, the memory device according to any one of Example Embodiment A through Example Embodiment D, wherein: the request comprises a boot request; and the one or more controllers are further operable to: check the at least one configurable setting in the memory device to determine that signed access for the logical portion of the storage is enabled; and cause the signed data to be sent to a host device for signed booting of the host device.

Example Embodiment F, the memory device according to Example Embodiment E, wherein: the boot request is associated with at least one of: a command line state that includes a low signal; a data line state that includes a low signal; or an argument for booting of the host device; and the one or more controllers are further operable to check the at least one configurable setting in the memory device to determine that signed access for the logical portion of the storage is enabled based at least on one of the command line state, the data line state, or the argument.

Example Embodiment G, the memory device according to any one of Example Embodiment A through Example Embodiment F, wherein the signed data comprises at least one of signed boot data, boot data, a signature, or a nonce.

Example Embodiment H, the memory device according to any one of Example Embodiment A through Example Embodiment G, wherein the logical portion of the storage comprises one or more of a boot partition, a boot logical unit, a defined portion of a partition, a defined address, or a range of addresses of a partition or of a logical unit, from which the data can be read and sent in response to receiving the request.

Example Embodiment I, the memory device according to any one of Example Embodiment A through Example Embodiment H, wherein the one or more controllers are further operable to receive a command to define the at least one configurable setting in the memory device so that it indicates that signed access for the logical portion of the storage is enabled or disabled.

Example Embodiment J, the memory device according to any one of Example Embodiment A through Example Embodiment I, wherein the one or more controllers are further operable to: cause a reply to be sent to a host device in response to receiving the request, the reply indicating the memory device is configured to sign the data based at least in part on a parameter to be received from the host device; and receive the parameter from the host device in response to sending the reply.

Example Embodiment K, the memory device according to Example Embodiment J, wherein the parameter comprises a nonce.

Example Embodiment L, the memory device according to any one of Example Embodiment A through Example Embodiment K, wherein the memory device comprises one of a Universal Flash Storage (UFS) module or an embedded MultiMediaCard (eMMC).

Example Embodiment M, a method comprising: receiving, at a memory device, a request for a read access to a logical portion of a storage associated with the memory device; reading, by a controller of the memory device, data associated with the logical portion of the storage; signing, by the controller of the memory device, the read data associated with the logical portion of the storage based in part on at least one configurable setting in the memory device indicating that signed access for the logical portion of the storage is enabled; and sending, by the memory device, the signed data in response to receiving the request for the read access.

Example Embodiment N, the method according to Example Embodiment M, further comprising using a key to sign the read data associated with the logical portion of the storage.

Example Embodiment O, the method according to Example Embodiment M, further comprising using a nonce to sign the read data associated with the logical portion of the storage, wherein the nonce is received in association with the request for the read access.

Example Embodiment P, the method according to any one of Example Embodiment M through Example Embodiment O, further comprising checking, based at least in part on the request for the read access, the at least one configurable setting in the memory device to determine that signed access is specifically enabled for the logical portion of the storage prior to signing the read data associated with the logical portion of the storage.

Example Embodiment Q, the method according to any one of Example Embodiment M through Example Embodiment P, wherein the request comprises a boot request and the method further comprises: checking the at least one configurable setting in the memory device to determine that signed access for the logical portion of the storage is enabled; and sending the signed data to a host device for signed booting of the host device.

Example Embodiment R, the method according to Example Embodiment Q, wherein: the boot request is associated with at least one of: a command line state that includes a low signal; a data line state that includes a low signal; or an argument for booting of the host device; and the at least one configurable setting in the memory device is checked to determine that signed access for the logical portion of the storage is enabled based at least on one of the command line state, the data line state, or the argument.

Example Embodiment S, the method according to any one of Example Embodiment M through Example Embodiment R, wherein the signed data comprises at least one of signed boot data, boot data, a signature, or a nonce.

Example Embodiment T, the method according to any one of Example Embodiment M through Example Embodiment S, wherein the logical portion of the storage comprises one or more of a boot partition, a boot logical unit, a defined portion of a partition, a defined address, or range of addresses of a partition or of a logical unit, from which the data can be read and sent in response to receiving the request.

Example Embodiment U, the method according to any one of Example Embodiment M through Example Embodiment T, further comprising receiving a command to define the at least one configurable setting stored in the memory device so that it indicates that signed access for the logical portion of the storage is enabled or disabled.

Example Embodiment V, the method according to any one of Example Embodiment M through Example Embodiment U, further comprising: sending, by the memory device, a reply to a host device in response to receiving the request, the reply indicating the memory device is configured to sign the data based at least in part on a parameter to be received from the host device; and receiving, by the memory device, the parameter from the host device in response to sending the reply.

Example Embodiment W, the method according to Example Embodiment V, wherein the parameter comprises a nonce.

Example Embodiment X, a memory device comprising: means for receiving a request for a read access to a logical portion of a storage associated with the memory device; means for reading data associated with the logical portion of the storage; means for signing the read data associated with the logical portion of the storage based in part on at least one configurable setting in the memory device indicating that signed access for the logical portion of the storage is enabled; and means for sending the signed data in response to receiving the request for the read access.

Example Embodiment Y, the memory device according to Example Embodiment X, wherein the means for signing uses a key to sign the read data associated with the logical portion of the storage.

Example Embodiment Z, the memory device according to Example Embodiment X, wherein the means for signing uses a nonce to sign the read data associated with the logical portion of the storage, wherein the nonce is received in association with the request for the read access.

Example Embodiment AA, the memory device according to any one of Example Embodiment X through Example Embodiment Z, further comprising means for checking, based at least in part on the request for the read access, the at least one configurable setting in the memory device to determine that signed access is specifically enabled for the logical portion of the storage prior to signing the read data associated with the logical portion of the storage.

Example Embodiment BB, the memory device according to any one of Example Embodiment X through Example Embodiment AA, wherein: the request comprises a boot request; the memory device further comprises means for checking the at least one configurable setting stored in the memory device to determine that signed access for the logical portion of the storage is enabled; and the means for sending sends the signed data to a host device for signed booting of the host device.

Example Embodiment CC, the memory device according to Example Embodiment BB, wherein: the boot request is associated with at least one of: a command line state that includes a low signal; a data line state that includes a low signal; or an argument for booting of the host device; the means for checking checks the at least one configurable setting in the memory device to determine that signed access for the logical portion of the storage is enabled based at least on one of the command line state, the data line state, or the argument.

Example Embodiment DD, the memory device according to any one of Example Embodiment X through Example Embodiment CC, wherein the signed data comprises at least one of signed boot data, boot data, a signature, or a nonce.

Example Embodiment EE, the memory device according to any one of Example Embodiment X through Example Embodiment DD, wherein the logical portion of the storage comprises one or more of a boot partition, a boot logical unit, a defined portion of a partition, a defined address, or range of addresses of a partition or of a logical unit, from which the data can be read and sent in response to receiving the request.

Example Embodiment FF, the memory device according to any one of Example Embodiment X through Example Embodiment EE, wherein the means for receiving receives a command to define the at least one configurable setting stored in the memory device so that it indicates that signed access for the logical portion of the storage is enabled or disabled.

Example Embodiment GG, the memory device according to any one of Example Embodiment X through Example Embodiment FF, wherein: the means for sending sends a reply to a host device in response to receiving the request, the reply indicating the memory device is configured to sign the data based at least in part on a parameter to be received from the host device; and the means for receiving receives the parameter from the host device in response to sending the reply.

Example Embodiment HH, the memory device according to Example Embodiment GG, wherein the parameter comprises a nonce.

Example Embodiment II, a host device comprising a controller operable to: send a request for a read access to a logical portion of a storage associated with a memory device; receive a reply from the memory device in response to sending the request, the reply indicating the memory device is required to sign the data based at least in part on a parameter to be received from the host device; send the parameter to the memory device in response to receiving the reply; receive signed data associated with the logical portion of the storage in response to sending the request for the read access; and use the signed data for signed booting of the host device.

Example Embodiment JJ, the host device according to Example Embodiment II, wherein a requirement to sign the data based at least in part on the parameter is determined via checking at least one configurable setting in the memory device.

Example Embodiment KK, a memory device comprising: a plurality of addressable memory locations, each addressable memory location of the plurality of addressable memory locations having at least one memory cell, the plurality of addressable memory locations collectively forming a storage; one or more controllers operable to: receive a request for a read access to a logical portion of the storage; read data associated with the logical portion of the storage; sign the read data associated with the logical portion of the storage based in part on the request for the read access being associated with an indication of signed access for the logical portion of the storage; and cause the signed data to be sent in response to receiving the request for the read access.

Example Embodiment LL, the memory device according to Example Embodiment KK, wherein the one or more controllers are further operable to use a key to sign the read data associated with the logical portion of the storage.

Example Embodiment MM, the memory device according to Example Embodiment KK, wherein: the one or more controllers are further operable to use a nonce to sign the read data associated with the logical portion of the storage; and the nonce is received in association with the request for the read access.

Example Embodiment NN, the memory device according to any one of Example Embodiment KK through Example Embodiment MM, wherein: the indication of signed access for the logical portion of the storage associated with the request for the read access comprises at least one of: a command line state that includes a low signal; a data line state that includes a low signal; or an argument for signed booting of the host device; and the one or more controllers are further operable to cause the signed data to be sent to a host device for signed booting of the host device.

Example Embodiment OO, the memory device according to Example Embodiment NN, wherein the one or more controllers are further operable to check, based at least in part on the request for the read access, at least one setting in the memory device to determine that signed access is specifically enabled for the logical portion of the storage prior to signing the read data associated with the logical portion of the storage.

Example Embodiment PP, the memory device according to any one of Example Embodiment KK through Example Embodiment OO, wherein the signed data comprises at least one of signed boot data, boot data, a signature, or a nonce.

Example Embodiment QQ, the memory device according to any one of Example Embodiment KK through Example Embodiment PP, wherein the logical portion of the storage comprises one or more of a boot partition, a boot logical unit, a defined portion of a partition, a defined address, or a range of addresses of a partition or of a logical unit, from which the data can be read and sent in response to receiving the request.

Example Embodiment RR, the memory device according to any one of Example Embodiment KK through Example Embodiment QQ, wherein the one or more controllers are further operable to: cause a reply to be sent to a host device in response to receiving the request, the reply indicating the memory device is configured to sign the data based at least in part on a parameter to be received from the host device; and receive the parameter from the host device in response to sending the reply.

Example Embodiment SS, the memory device according to Example Embodiment RR, wherein the parameter comprises a nonce.

Example Embodiment TT, the memory device according to any one of Example Embodiment KK through Example Embodiment SS, wherein the memory device comprises one of a Universal Flash Storage (UFS) module or an embedded MultiMediaCard (eMMC).

Example Embodiment UU, a method comprising: receiving, at a memory device, a request for a read access to a logical portion of a storage associated with the memory device; reading, by a controller of the memory device, data associated with the logical portion of the storage; signing, by the controller of the memory device, the read data associated with the logical portion of the storage based in part on the request for read access being associated with an indication of signed access for the logical portion of the storage; and sending, by the memory device, the signed data in response to receiving the request for the read access.

Example Embodiment VV, the method according to Example Embodiment UU, further comprising using a key to sign the read data associated with the logical portion of the storage.

Example Embodiment WW, the method according to Example Embodiment UU, further comprising using a nonce to sign the read data associated with the logical portion of the storage, wherein the nonce is received in association with the request for the read access.

Example Embodiment XX, the method according to any one of Example Embodiment UU through Example Embodiment WW, wherein: the indication of signed access for the logical portion of the storage associated with the request for the read access comprises at least one of: a command line state that includes a low signal; a data line state that includes a low signal; or an argument for signed booting of the host device; and the method further comprises sending the signed data to a host device for signed booting of the host device.

Example Embodiment YY, the method according to Example Embodiment XX, further comprising checking, based at least in part on the request for the read access, at least one setting in the memory device to determine that signed access is specifically enabled for the logical portion of the storage prior to signing the read data associated with the logical portion of the storage.

Example Embodiment ZZ, the method according to any one of Example Embodiment UU through Example Embodiment YY, wherein the signed data comprises at least one of signed boot data, boot data, a signature, or a nonce.

Example Embodiment AAA, the method according to any one of Example Embodiment UU through Example Embodiment ZZ, wherein the logical portion of the storage comprises one or more of a boot partition, a boot logical unit, a defined portion of a partition, a defined address, or range of addresses of a partition or of a logical unit, from which the data can be read and sent in response to receiving the request.

Example Embodiment BBB, the method according to any one of Example Embodiment UU through Example Embodiment AAA, further comprising: sending, by the memory device, a reply to a host device in response to receiving the request, the reply indicating the memory device is configured to sign the data based at least in part on a parameter to be received from the host device; and receiving, by the memory device, the parameter from the host device in response to sending the reply.

Example Embodiment CCC, the method according to Example Embodiment BBB, wherein the parameter comprises a nonce.

Example Embodiment DDD, a memory device comprising: means for receiving a request for a read access to a logical portion of a storage associated with the memory device; means for reading data associated with the logical portion of the storage; means for signing the read data associated with the logical portion of the storage based in part on the request for read access being associated with an indication of signed access for the logical portion of the storage; and means for sending the signed data in response to receiving the request for the read access.

Example Embodiment EEE, the memory device according to Example Embodiment DDD, wherein the means for signing uses a key to sign the read data associated with the logical portion of the storage.

Example Embodiment FFF, the memory device according to Example Embodiment DDD, the means for signing uses a nonce to sign the read data associated with the logical portion of the storage, wherein the nonce is received in association with the request for the read access.

Example Embodiment GGG, the memory device according to any one of Example Embodiment DDD through Example Embodiment FFF, wherein: the indication of signed access for the logical portion of the storage associated with the request for the read access comprises at least one of: a command line state that includes a low signal; a data line state that includes a low signal; or an argument for signed booting of the host device; and wherein the means for sending sends the signed data to a host device for signed booting of the host device.

Example Embodiment HHH, the memory device according to Example Embodiment GGG, further comprising means for checking, based at least in part on the request for the read access, at least one setting in the memory device to determine that signed access is specifically enabled for the logical portion of the storage prior to signing the read data associated with the logical portion of the storage.

Example Embodiment III, the memory device according to any one of Example Embodiment DDD through Example Embodiment HHH, wherein the signed data comprises at least one of signed boot data, boot data, a signature, or a nonce.

Example Embodiment JJJ, the memory device according to any one of Example Embodiment DDD through Example Embodiment III, wherein the logical portion of the storage comprises one or more of a boot partition, a boot logical unit, a defined portion of a partition, a defined address, or range of addresses of a partition or of a logical unit, from which the data can be read and sent in response to receiving the request.

Example Embodiment KKK, the memory device according to any one of Example Embodiment DDD through Example Embodiment JJJ, wherein: the means for sending sends a reply to a host device in response to receiving the request, the reply indicating the memory device is configured to sign the data based at least in part on a parameter to be received from the host device; and the means for receiving receives the parameter from the host device in response to sending the reply.

Example LLL, the memory device according to Example Embodiment KKK, wherein the parameter comprises a nonce.

Example Embodiment MMM, a host device comprising a controller operable to: send, to a memory device, a request for a read access to a logical portion of a storage associated with the memory device, the read access being associated with an indication of signed access for the logical portion of the storage to implement an instance of signed booting of the host device; receive, from the memory device, signed data associated with the logical portion of the storage in response to sending the request for the read access; and use the signed data for signed booting of the host device.

Example Embodiment NNN, the host device according to Example Embodiment MMM, wherein the indication of signed access for the logical portion of the storage associated with the read access comprises at least one of: a command line state that includes a low signal; a data line state that includes a low signal; or an argument.

Example Embodiment OOO, the host device according to Example Embodiment MMM or Example Embodiment NNN, wherein the controller is further operable to send a command to define at least one setting in the memory device so that it indicates that signed access for the logical portion of the storage is enabled or disabled.

Example Embodiment PPP, the host device according to any one of Example Embodiment MMM through Example Embodiment OOO, wherein the controller is further operable to: receive a reply from the memory device in response to sending the request, the reply indicating the memory device is configured to sign the data based at least in part on a parameter to be received from the host device; and send the parameter to the memory device in response to receiving the reply.

Example Embodiment QQQ, the host device according to Example Embodiment PPP, wherein the parameter comprises a nonce.

What is claimed is:
1. A memory device comprising:
   a plurality of addressable memory locations, each addressable memory location of the plurality of addressable memory locations having at least one memory cell, the plurality of addressable memory locations collectively forming a storage; and one or more controllers operable to:
receive a request for a read access to a logical portion of the storage;
read, as read data, data associated with the logical portion of the storage;
determine, based at least in part on a configurable setting and as a determination, that signed access to the logical portion is enabled;
sign, as signed data, the read data associated with the logical portion of the storage based at least in part on the determination that signed access to the logical portion is enabled;
and cause the signed data to be sent at least partially in response to receiving the request for the read access.

2. The memory device according to claim 1, wherein the one or more controllers are further operable to use a key to sign the read data associated with the logical portion of the storage.

3. The memory device according to claim 1, wherein:
the one or more controllers are further operable to use a nonce to sign the read data associated with the logical portion of the storage; and
the nonce is received in association with the request for the read access.

4. The memory device according to claim 1, wherein the one or more controllers are further operable to check, based at least in part on the request for the read access, the at least one configurable setting in the memory device to determine that the signed access is specifically enabled for the logical portion of the storage prior to signing the read data associated with the logical portion of the storage.

5. The memory device according to claim 1, wherein the signed data comprises at least one of signed boot data, boot data, a signature, or a nonce.

6. The memory device according to claim 1, wherein the logical portion of the storage comprises one or more of a boot partition, a boot logical unit, a defined portion of a partition, a defined address, or a range of addresses of a partition or of a logical unit, from which the data can be read and sent at least partially in response to receiving the request.

7. The memory device according to claim 1, wherein the one or more controllers are further operable to receive a command to define the at least one configurable setting in the memory device so that it indicates that the signed access for the logical portion of the storage is enabled or disabled.

8. The memory device according to claim 1, wherein the one or more controllers are further operable to:
cause a reply to be sent to a host device at least partially in response to receiving the request, the reply indicating the memory device is configured to sign the read data based at least in part on a parameter to be received from the host device; and
receive the parameter from the host device at least partially in response to sending the reply.

9. The memory device according to claim 8, wherein the parameter comprises a nonce.

10. The memory device according to claim 1, wherein the memory device comprises one of a Universal Flash Storage (UFS) module or an embedded MultiMediaCard (eMMC).

11. A method comprising:
receiving, at a memory device, a request for a read access to a logical portion of a storage associated with the memory device;
reading, as read data and by a controller of the memory device, data associated with the logical portion of the storage;
determining, based at least in part on a configurable setting, that signed access to the logical portion is enabled;
signing, as signed data and by the controller of the memory device, the read data associated with the logical portion of the storage based at least in part on the determining that signed access to the logical portion is enabled; and
sending, by the memory device, the signed data at least partially in response to receiving the request for the read access.

12. The method according to claim 11, further comprising using a key to sign the read data associated with the logical portion of the storage.

13. The method according to claim 11, further comprising using a nonce to sign the read data associated with the logical portion of the storage, wherein the nonce is received in association with the request for the read access.

14. The method according to claim 11, further comprising checking, based at least in part on the request for the read access, the at least one configurable setting in the memory device to determine that the signed access is specifically enabled for the logical portion of the storage prior to signing the read data associated with the logical portion of the storage.

15. The method according to claim 11, wherein the signed data comprises at least one of signed boot data, boot data, a signature, or a nonce.

16. The method according to claim 11, wherein the logical portion of the storage comprises one or more of a boot partition, a boot logical unit, a defined portion of a partition, a defined address, or a range of addresses of a partition or of a logical unit, from which the data can be read and sent at least partially in response to receiving the request.

17. The method according to claim 11, further comprising receiving a command to define the at least one configurable setting stored in the memory device so that it indicates that the signed access for the logical portion of the storage is enabled or disabled.

18. The method according to claim 11, further comprising: sending, by the memory device, a reply to a host device at least partially in response to receiving the request, the reply indicating the memory device is configured to sign the read data based at least in part on a parameter to be received from the host device; and
receiving, by the memory device, the parameter from the host device at least partially in response to sending the reply, wherein the parameter comprises a nonce.

19. A host device comprising a controller operable to:
send a request for a read access of a logical portion of a storage associated with a memory device;
receive a reply from the memory device at least partially in response to sending the request, the reply indicating that the memory device is required, based at least in part on a configurable setting indicating that signed access to the logical portion is enabled, to sign the data based at least in part on a parameter to be received from the host device;
send the parameter to the memory device at least partially in response to receiving the reply;
receive signed data associated with the logical portion of the storage at least partially in response to sending the request for the read access; and
use the signed data for signed booting of the host device.

20. the host device according to claim 19, wherein the parameter comprises a nonce.

* * * * *